United States Patent [19] [11] 4,160,910

Thornton et al. [45] Jul. 10, 1979

[54] RECHARGEABLE 99MO/99MTC GENERATOR SYSTEM

[75] Inventors: Alfred K. Thornton, New Hampton; Frank E. Cerone, New Windsor, both of N.Y.

[73] Assignee: Union Carbide Corporation, New York, N.Y.

[21] Appl. No.: 808,332

[22] Filed: Jun. 20, 1977

[51] Int. Cl.[2] .......... G01N 21/24; G01T 1/00

[52] U.S. Cl. .......... 250/432 PD; 250/328

[58] Field of Search .......... 250/432, 432 PD, 428, 250/435, 506, 328; 252/301.1 R; 424/1, 1.5

[56] References Cited

U.S. PATENT DOCUMENTS

| | | | |
|---|---|---|---|
| 3,369,121 | 2/1968 | Bruno et al. | 250/432 PD |
| 3,576,998 | 5/1971 | Deutsch et al. | 250/432 PD |
| 3,655,981 | 4/1972 | Montgomery et al. | 250/432 PD |
| 3,710,118 | 1/1973 | Holgate et al. | 250/432 PD |
| 3,912,935 | 10/1975 | Harris | 250/432 PD |
| 3,920,995 | 10/1975 | Czaplinski et al. | 250/432 PD |
| 3,997,784 | 12/1976 | Picumko et al. | 250/432 PD |
| 4,020,351 | 4/1977 | Gemmill, Sr. et al. | 250/432 PD |
| 4,020,355 | 4/1977 | Czaplinski et al. | 250/506 |

*Primary Examiner*—Verlin R. Pendegrass
*Assistant Examiner*—S. A. Cangialosi
*Attorney, Agent, or Firm*—William Raymond Moran

[57] ABSTRACT

A rechargeable system is provided for the production of sterile, non-pyrogenic, isotonic solutions of radioisotopes such as sodium pertechnetate, which are useful as diagnostic agents in the medical field. A unique feature of the system is that transfer of the recharging supply of the parent isotope from the shipping shield to the generator contained in the generator shield can be effected with minimal exposure to radiation.

10 Claims, 7 Drawing Figures

RECHARGEABLE 99MO/99MTC GENERATOR SYSTEM

This invention relates in general to a rechargeable system for generating radioisotopes. In one aspect, the invention is directed to a rechargeable system for generating technetium-99 m from its parent isotope, molybdenum-99. In a further aspect, this invention relates to a shipping shield containing a vial of the recharging parent isotope wherein the septum of the vial can be pierced and the isotope transferred to a generator without the operator touching or removing the vial from its shipping shield.

In recent years there has been a marked increase in the use of radioisotopes, particularly in industrial applications such as in the measurement of flow rates, process control, radiometric chemistry and the like. Radioisotopes are also of current interest in medical research and as diagnostic agents. For example, medical investigation has shown that radioisotopes, such as technetium-99 m, are extremely useful tools for diagnosis. High purity technetium-99 m is used as a radioisotope in a variety of medical research and diagnosis. It is well suited for liver, lung, blood, pool and tumor scanning, and is preferred over other radioactive isotopes because of its short half-life which results in reduced exposure to the organs to radiation.

Since the radioisotopes which are used have relatively short half-lives, it is the common practice to ship the user the parent isotope. The user then extracts the desired isotope as his needs require. For example, technetium-99 m can be shipped to the user as its parent isotope, i.e. molybdenum-99. When the radioisotope is desired, the technetium-99 m can be eluted from the parent isotope. Due to the relatively high degree of radioactivity, elaborate precautions must be taken to insure proper shielding from both the parent isotope and the eluted radioisotope. Lead containers are commonly employed for the storage and transportation of the radioactive materials. Hence use of the radioisotopes is largely limited to scientists who have been trained in the special handling techniques required to minimize the hazards inherently present.

However, prior to the present invention the type of systems provided to industrial sites, hospitals, research centers and the like were usually cumbersome and comprised of many individual parts. It was necessary to assemble the various components such as the generator column, eluant reservoir, and receiving vial, while observing the necessary precautions involved with the use of radioactive compositions.

In past years, as disclosed in U.S. Pat. No. 3,382,152, a generator was developed by using reactor irradiated molybdenum. When molybdenum is irradiated in a reactor, molybdenum-99 with a high degree of radionuclide purity is obtained by the $(n,\mu)$ reaction. Furthermore, the chemical processing of the irradiated target is simple. This method was widely used by radiopharmaceutical manufacturers.

However, when the molybdenum target is irradiated in the reactor, only an extremely small portion is converted to radioactive molybdenum-99. Therefore, the specific activity of the molybdenum, i.e., the ratio of activity to the total weight of elemental molybdenum is small. In practice, the manufacturer of technetium-99 m generators usually loads the column with an amount of radioactive molybdenum to ensure that the desired activity will be present. However, this amount is limited by the active absorption sites on the substrate in the column. In practice, the active absorption sites on alumina are virtually consumed by inactive molybdenum, often to the point where no more molybdenum can be absorbed.

Generators which employ reactor irradiated molybdenum also present the problem of radioactive waste disposal. While molybdenum has a relatively short half-life, other isotopes formed as a result of the irradiation, and present on the column, necessitate disposal of the spend generators in compliance with regulations of the Nuclear Regulatory Commission.

More recently, however, methods have been developed for production of fission product molybdenum which provides a technetium daughter isotope ideally suitable for diagnostic purposes. One process as disclosed in U.S. Pat. No. 3,799,883 comprises a plurality of steps, one of which involves precipitating molybdenum-99 from an irradiated uranium material with alpha-benzoinoxime. The resulting molybdenum-99 has a radionuclidic purity of at least 99.99%. Additionally, U.S. Pat. No. 3,940,318 discloses a process for the preparation of a primary target useful for the production of fission products in a nuclear reactor. Methods have also been disclosed for loading generator column with fission product molybdenum-99. One such process comprises the steps of (a) dissolving in an aqueous solution at pH. from about 4 to 9 an inorganic salt of fission product molybdenum-99 having a radionoclidic purity of at least 99.99%, (b) contacting a column containing an inorganic substrate which selectively retains molybdate ions with said solution to load said column, and (c) selectively eluting said column with a solvent to separate technetium-99 m from its radioactive parent molybdenum-99 m that is deposited on the substrate. Operating in the aforesaid manner provides a selective separation of technetium-99 m from the fission product radioactive molybdenum-99 compound with very high efficiency, i.e., over 80 percent. In contrast to known generators which usually take at least 2 hours to prepare, the generators of the fission product can be conveniently prepared in less than 5 minutes. Moreover, since fission product molybdenum-99 is employed, the resulting technetium-99 m solution is of a greater concentration than theretofore possible. For example, technetium-99 can be obtained from the generators described in concentrations of as high as 1000 millicuries per milliliter, or higher.

However, prior to the present invention and the discovery of the fission product method, it was the practice to supply each user with a new column in addition to all the accessory equipment needed for elution of the technetium-99 m radioisotope. This involved a new molybdenum-loaded column and the necessary shielding to contain radioactive emission. Only facilities licensed by the Nuclear Regulatory Commission were permitted to sell these generator systems.

When the activity of the molybdenum-99 decreases below a certain value, it is no longer useful for diagnostic or industrial application. However, as indicated previously, the column containing an isotope of a much longer half-life than the molybdenum could not be discarded without taking the customary precautions against radioactive emission. In most instances, particularly for diagnostic purposes where generator systems are supplied on a routine basis, procedures for handling and disposing of the columns must be carefully observed.

Canadian Pat. No. 958,225 discloses a process for recharging a technetium-99 m generator with a solution of molybdenum-99 without any pretreatment of the generator column. However, the process was complex and required elaborate precautions to ensure a radiologically safe transfer of the parent isotope to the generator. The operator was required to manually insert the needle of the cannular tubing to pierce the septum of the recharging vial in its shipping shield and connect the transfer conduits to the generator while continually attempting to limit exposure to radiation. While the invention was used commercially, there was no automated transfer of isotope that allowed minimum exposure.

Accordingly, one or more of the following objects can be achieved by the practice of this invention. An object of this invention is to provide a rechargeable radioisotope generator system in which the transfer of the rechargeable supply of parent isotope can be effected in a simple, straightforward, and radiological safe manner. Another object of this invention is to provide a shielded vial of the recharging parent isotope wherein the septum of the vial can be pierced and the contents thereof transferred to a shielded generator in an essentially automated manner and without the need for the operator to remove the vial from its shielded shipping container. A further object is to provide a system which minimizes the disposal of spent generator units. Another object of this invention is to provide a generator system which can be shipped as a cold package to the user and followed at the desired time by the vial of parent isotope in its separate shipping container. A still further object is to provide a rechargeable system wherein the generator loading procedure is conducted at the user's location using the transfer mechanism incorporated in the shipping shield and case assembly these and other objects will readily become apparent to those skilled in the art in the light of the teachings herein setforth.

The objects of the invention and the preferred embodiments thereof will best be understood by reference to the accompanying drawings wherein.

Figure 3A:
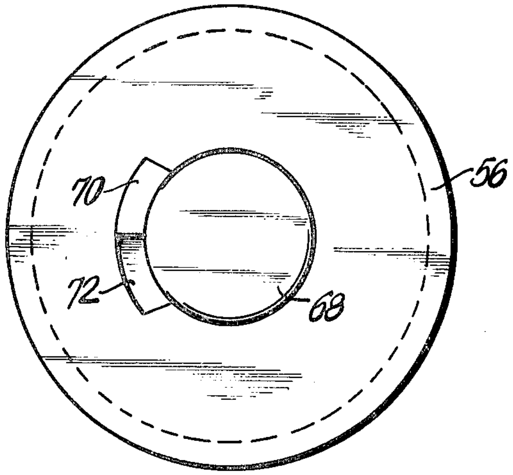
FIG. 3 is a cross-sectional view of the shipping shield taken through the front of the generator system along line AA.

FIG. 3*a* is a top view of the closure shield for the shipping shield and depicts the retaining means for the slidably mounted plug or activating device.

Figure 4A:
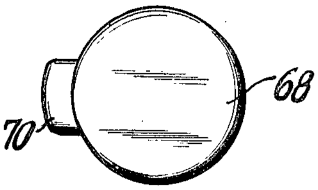
Figure 4:
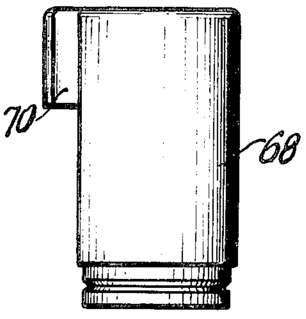

FIGS. 4 and 4*a* are a side and top view respectively, of the plug which is slidably mounted in the closure shield.

Figure 5:
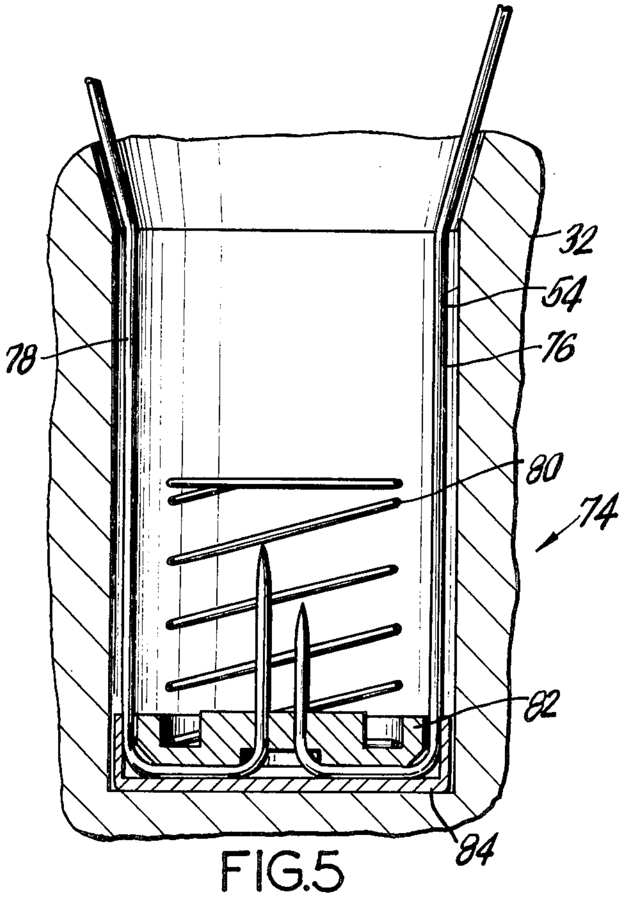

FIG. 5 is an enlarged cross-sectional view of the conduits and piercing means for engaging the vial containing the parent radioisotope.

Figure 1:
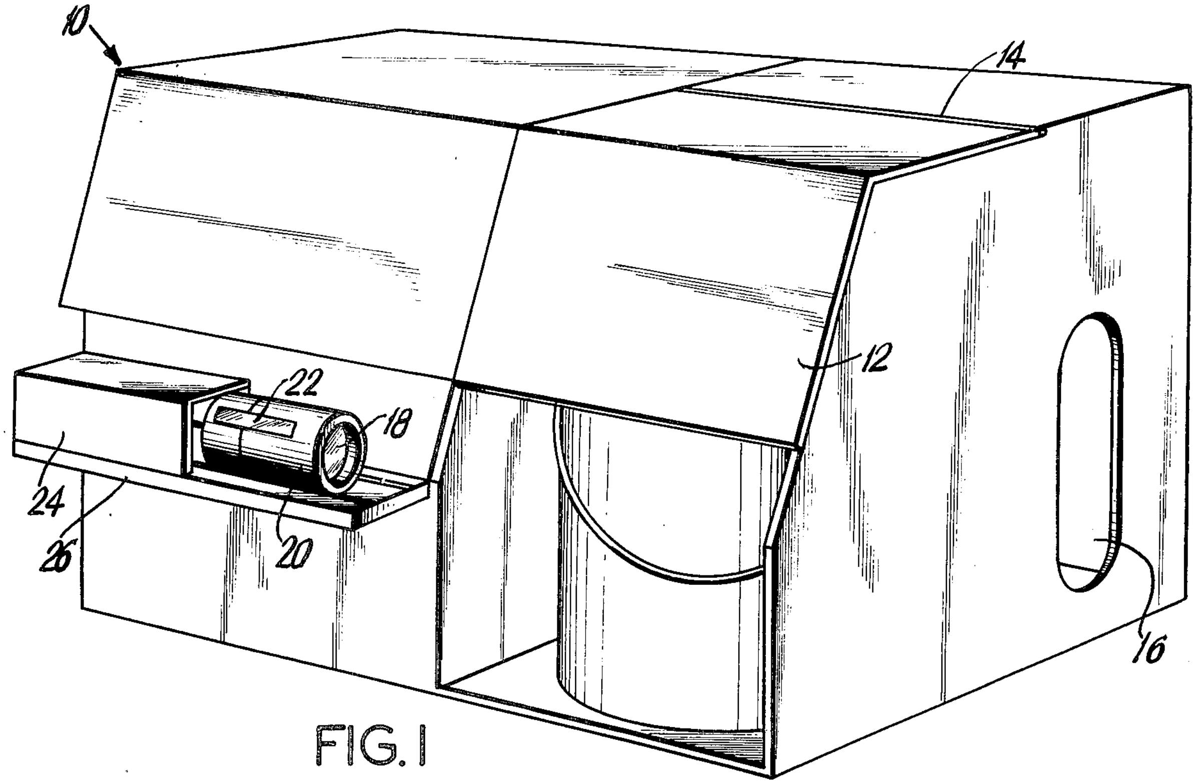
FIG. 1 is a perspective view of a rechargeable generator system of this invention and shows the outer case assembly.

With further reference to the drawings, the rechargeable generator system is depicted in FIG. 1. The right hand portion of the case assembly 10 of the generator system houses the shipping shield and eluant reservoir, not shown. Access to the interior of the system to insert the shipping shield and replenish the eluant reservoir is by means of the front cover 12 of the case assembly which is hinged along edge 14. Cut-away opening 16 affords a view of the interior and particularly the eluant reservoir. The left hand portion of the generator system houses the shielded generator also not shown. Elution vial 18 is contained within shield 20 and can have a window 22 through which filling of the vial can be observed. Shield 24 covers the dispensing mechanism which is comprised of the tubing from the generator, filter and dispensing needle. Shield 24 can be slidable mounted so that it can traverse the length of shelf 26 to permit access to the filter and dispensing needle and to further shield the elution vial.

The case assembly, or housing of the generator system can be fabricated from a variety of materials. In practice, stainless steel has been found to be suitable although other material can be employed. Adequate shielding from radioactive emission is provided within the case assembly by the shielding enclosures for both the generator and vial containing the parent isotope as well as the conduits.

Figure 2:
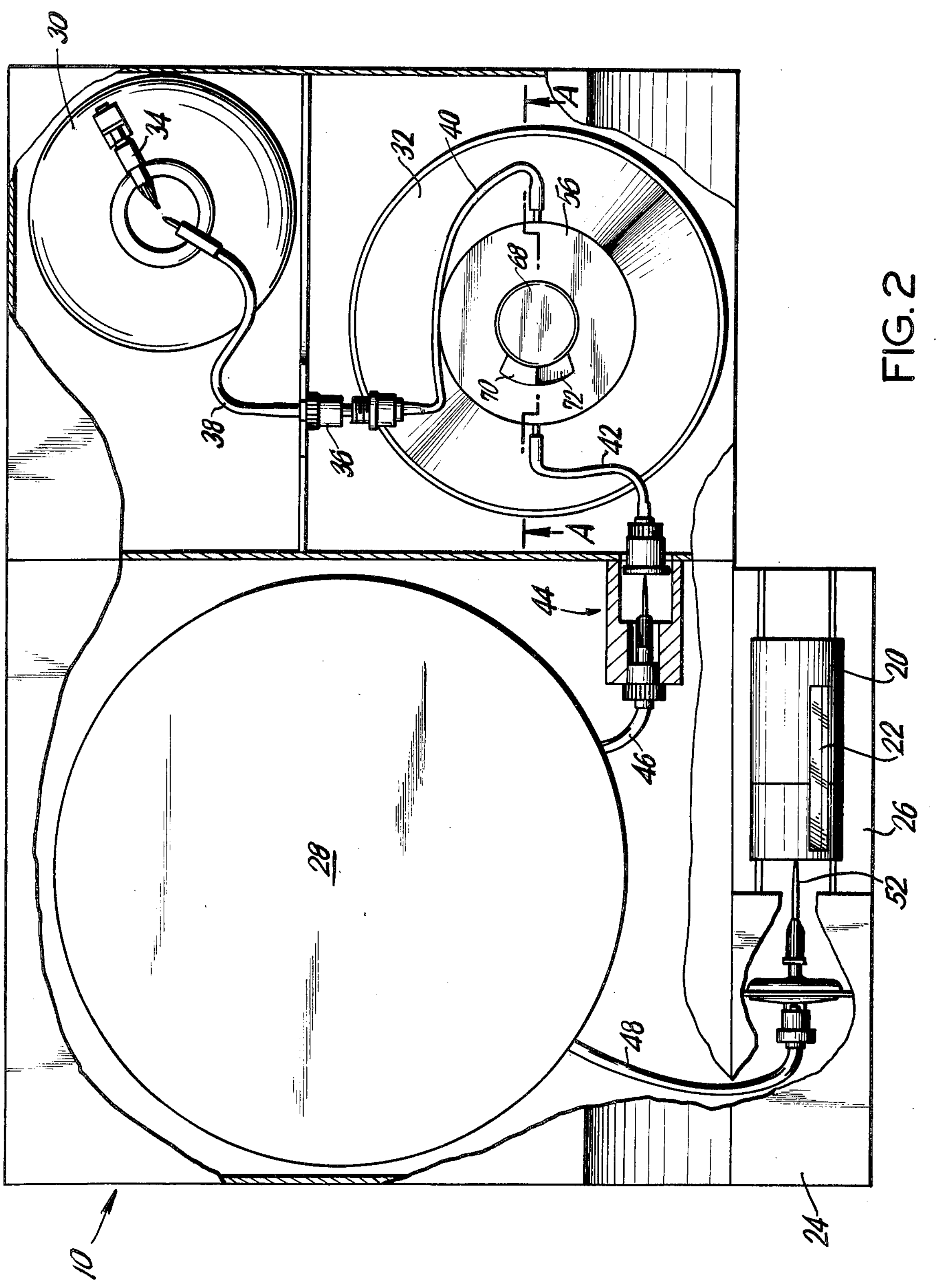
FIG. 2 is a partially cut-away view of the top of the generator system and shows the shielded generator, eluant reservoir and shipping shield which contains the vial.

FIG. 2 is a partial cut-away view of the top of the generator system and shows generator shield 28 in which is contained the generator column, not shown, eluant reservoir 30 and shipping shield 32 which contains the vial of parent isotope, also not shown. The entire generator system contained in the case assembly 10, with the exception of the shipping shield containing the vial, can be shipped to the user as a cold package and remain at the user's location for an indefinite period of time. This need only be done on a one time basis since each time that the column needs replenishing the parent isotope is shipped in a separate vial contained in the shipping shield. It will be evident that savings will be made in material costs since a complete hot generator need not be shipped each time.

For example, current marketable technetium-99 m generators are manufactured and shipped to the user with the parent isotope, molybdenum-99 absorbed on the resin in the column as a complete package. This is generally done on a weekly basis and involves a waste of "cosmetic packaging".

The Eluent reservoir 30 is fitted with a one-way-check valve 34 containing a sterile filter which allows air to enter the reservoir when the eluting solution is drawn through the system.

Sterile coupling means 36 joins, conduit mean 38 and 40 from the reservoir 30 to the eluant side of the shipping shield 32. Conduit means 42 leads from the isotope side of the shipping shield to sterile coupling means 44 and via conduit means 46 to the generator. Coupling means 44 can consist of a septum fitting on the shipping shield side and piercing means, such as a needle connected to conduit means 46 on the generator side. However, other coupling means can also be employed. Conduit means 46 connects to one end of the column within generator shield 28 containing the absorbed radioisotope and conduit means 48 connects the other end of the column to the exterior of the case assembly.

The eluted radioisotope passes from the generator by shields conduit means 48 to the outside of the generator system where it is also shielded by shield 24 as shown in FIG. 1. As previously indicated, shield 24 can be hinged at its upper end to shelf 26 or it can be slidably mounted to traverse shelf 26 containing the elution vial. The tube means 48 conducts the eluted radioisotope through a sterile filter such as a millipore filter, to the terminus of the system. The filter is fitted with closure not shown which can be removed for attachment of needle 52. The generator system operates by means of a vacuum in the elution vial and check valve 34 on the saline reservoir. When the septum of the vial is pierced by needle 52 saline is drawn through the tube assembly conduit means into the generator where the isotope is eluted and out through the filter into the shielded vial.

Figure 3:
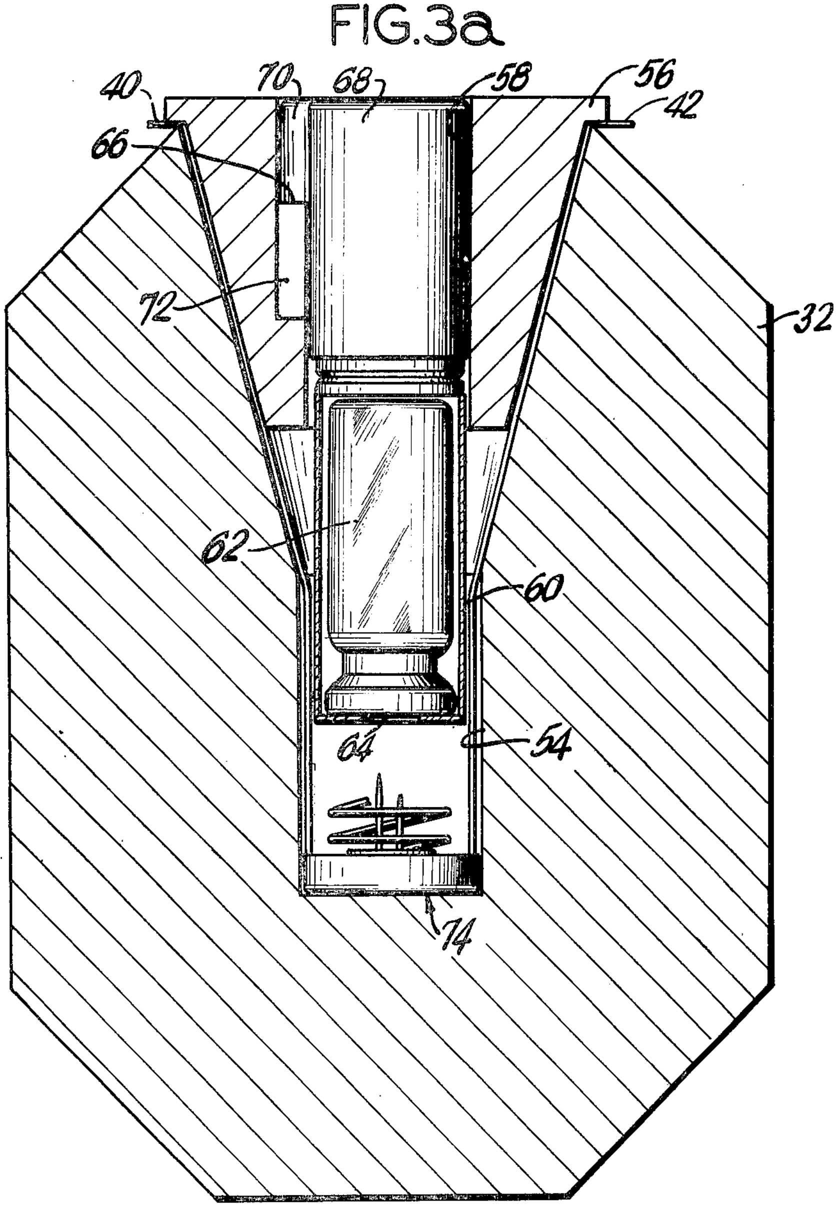

FIG. 3 is a cross-sectional view of the shipping shield 32 taken through the front of the generator system along line AA. Shield 32 contains an inner chamber 54 in the center thereof. The upper portion of the chamber has a wider diameter at the top and tapers to a narrow section approximately half-way down the shield. A tapered closure 56 fits into the upper portion of the shield. The tapered closure 56 has an inner bore traversing its center. The lower portion of chamber 54 has enclosure 60 which holds isotope vial 62 and positions the vial above the piercing means. Vial 62 is located directly below the inner bore 58 of tapered closure 56. Vial 62 is inserted in the chamber in such a manner that the pierceable septum 64 faces the bottom of the chamber. Means are provided in the bottom of the cavity to pierce the septum and allow ingress of eluant and egress of the parent isotope around the sides of retainer 60 to the exterior of the shield. Tapered closure 56 has a retaining shelf 66 on at least one portion of its inner bore 58. Bore 58 is adopted to receive plug 68 which when depressed into the bore forces the vial into the piercing means. Plug 68 has a lip 70 which engages and is retained by shelf 66. Plug 68 can be turned so that lip 70 no longer engages shelf 66 and can move downwardly through channel 72 to engage the vial 62.

FIG. 3*a* is a top view of the tapered closure 56 and shows the top of plug 68, lip 70 and channel 72. When plug 68 is moved counter-clockwise, lip 70 no longer contacts shelf 66 and plug 68 is free to traverse bore 58 by means of channel 72.

FIGS. 4 and 4*a* are respectively, a cross-sectional view and a top view of plug 68. When plug 68 is positioned in closure 56, a retaining means or key can be inserted into channel 72 to prevent plug 68 from moving. The retaining means is preferably comprised of the same material as the plug to ensure adequate shielding and can be designed to occupy the entire channel. The key can have a pin or pull wire to aid in its removal when the system is to be activated.

FIG. 5 depicts a typical piercing and conduit means that can be employed in the rechargeable generator system of the present invention. The piercing and conduit 74 means are comprised of: (a) conduit means 78 which joins conduit means 40 from the eluant reservoir, (b) conduit means 76 which joins conduit means 42 to the generator, both of which have needle-like ends and are positioned to pierce septum 64 of vial 62 (c) a collapsible platform showing in the drawing as spring 80, spring holder 82, and cup 84.

As is evident from the foregoing description, the present invention provides a rechargeable, radioisotope generator system which avoids many of the disadvantages hereinbefore enumerated. The generator system is comprised of, in combination:

(1) a case assembly having contained therein:

(a) a portable shipping shield, comprised of:

(i) a main shield having an inner chamber, communicating to the exterior of the main shield, the chamber having a reversed tapered portion thereof terminating with a greater diameter at the exterior surface of the main shield, (ii) a closure shield tapered to engage the main shield to provide a radiologically safe seal and yet provide conduit means for ingress and egress of liquids, the closure shield having an inner bore traversing its center in alignment with the axis of, and about the same diameter as chamber, (iii) a plug which is slidably mounted within the inner bore and which can be retained in a fixed position therein by a lip on its upper surface which engages a retaining shelf on at least one portion of the closure shield; the plug being retained in place by removable retaining means which, when the plug is disengaged from the shelf, it can slidably move through at least a portion of the bore and into said inner chamber, (iv) a vial for radioisotopes contained within and in alignment with the chamber and having a piercable septum on at least one end thereof, and (v) conduit and piercing means contained within the chamber for piercing the septum and permitting ingress from the exterior of the shipping shield from the vial of radioisotope to the exterior of the shipping shield;

(b) a shielded generator having means for absorbing and retaining a parent radioisotope from which a daughter radioisotope can be eluted, (c) a reservoir of eluant disposed in the assembly and in close proximity to the shield generator and shipping shield, and having disposed thereon a sterile, one-way-check valve communicating to the atomosphere, (d) first conduit means communicating from the reservoir to the shipping shield, second conduit means communicating from the shipping shield to the shielded generator, and third conduit means communicating from the shield generator to the exterior of the assembly;

(2) a shelf traversing the front exterior of the assembly, a portion of which is shielded by exterior shielding means, (3) a shielded elution vial into which the eluate is dispensed, and (4) filter means disposed at a apoint between the vial and the third conduit means.

In practice, it has been formed that a variety of connections can be employed to couple the shipping shield to the generator system. Although FIG. 2 depicts coupling device 44 as a needle and piercable septum, other systems, such as a membrane system, can also be employed. Likewise, coupling 36 can contain a check valve to prevent an inadvertent back-up of isotope to the eluant reservoir. Although not shown in the drawings, shielding is preferably provided on the conduits to ensure a radiologically safe system.

As is evident from the drawings and the foregoing description, the user is subjected to minimal exposure in recharging the generator. Upon receipt of the shipping shield containing the vial of radioisotope, the user need only make the connections to the eluant reservoir and generator; thereafter the retaining means are removed from the shielded closure and the plug turned so that it no longer engages the shelf and is free to force the vial onto the piercing means. Since the retaining means and plug are comprised of a shielding material such as lead, exposure to radiation is minimized. In practice, and for added protection, it is preferred that the weight of the plug itself, be insufficient to force the vial onto the piercing means. Accordingly, it has been found that a simple plunger device can be clamped to the shipping shield which; for example, by a screw mechanism will force the plug into the chamber and engage the vial with the piercing means.

Although the generator system of this invention can be employed for dispensing a variety of isotopes, it is particularly useful for the production of technetium-99 m, the daughter isotope of molybdenum-99. Irradiation of compounds to produce fission product molybdenum-99 is a well known technique and can be effected by placing the proper compound in the irradiation zone of a nuclear ractor, paticle generator, or neutron isotope source. For example, see U.S. Pat. No. 3,940,318 previously mentioned.

Although a variety of compounds are suitable for use in the preparation of molybdenum-99, the preferred target is uranium-235. In the event that other compounds are employed, it is often necessary to isolate the molybdenum component after irradiation. Illustrative compounds which can be employed as the source of fission product molybdenum-99 include, among others, fissionable materials such as uranium-238, plutonium-239, and the like. Thereafter, the irradiated compound is dissolved in a suitable solvent and the molybdenum-99 is selectively removed. The techniques to dissolve and isolate a pure molybdenum-99 as its inorganic salt are well known in the art.

The fission product molybdenum-99 in the form of an inorganic salt, such as sodium molybdate, potassium molybdate, ammonium molybdate and the like, is then dissolved in an aqueous solution at a pH of from about 4 to about 9. If necessary, the pH can be adjusted to this range by the addition of acid or base. The solution is then ready to be sent to the user in the shipping shield for recharging the on-site generator.

The present invention thus provides a simple and efficient method for recharging generator systems which no longer produce isotopes, of the desired radioactivity. By operating in accordance with the teachings of this invention, not only can generators be reused, but the accumulation of old generators which still emit hazardous amounts of radioactivity is minimized. Moreover, it is possible to reuse the accessory equipment and the user need only be supplied with a solution of the radioisotope; for example, fission product molybdenum-99 for recharging his generator. Additionally, since radioisotopes usch as fission product molybdenum-99, ussually possesses a high degress of specific activity, per unit volume, the quantities of material sent to the user are small compared to generator systems currently being marketed.

In practice, it has been found that generators can be recharged as many as 13 times or more without any difficulties in radionuclidic purity, molybdenum breadthrough, or the like. All that the user need do is to charge the generator with a fresh supply of an aqueous solution of fission product molybdenum. Due to its high specific activity, a relatively small volume of the radioisotope-containing liquid is needed which can be furnished to the user at predetermined intervals.

Although the invention has been illustrated by the preceding drawings and discussion, it is not to be construed as being limited to the materials disclosed therein, but rather the invention relates to the generic area as hereinbefore described. Various modifications thereof can be made without departing from the spirit and scope thereof.

What is claimed is:

1. A rechargeable, radioisotope, generator system, comprised of, in combination:

(1) a case assembly having contained therein:

(a) a portable shipping shield, comprised of, in combination:

(i) a main shield having an inner chamber communicating to the exterior of said main shield, said chamber having a tapered portion thereof terminating with a greater diameter at the exterior surface of said main shield, (ii) a closure shield tapered to engage said main shield to provide a radiological safe seal and yet provide conduit means for ingress and egress of liquids, said closure shield having an inner bore traversing its center in alignment with the axis of and about the same diameter of said chamber, (iii) a plug which is slidably mounted within said inner bore and which can be retained in a fixed position therein by a lip on its upper surface which engages a retaining shelf on at least one portion of said closure shield; said plug being retained in place by removable retaining means which when said plug is disengaged from said shelf it can slidably move through at least a portion of said bore and into said inner chamber, (iv) a vial for radioisotopes contained within and in alignment with said chamber and having a piercable septum on at least one end thereof, and (v) conduit and piercing means contained within said chamber for piercing said septum and permitting ingress of eluant from the exterior of said shipping shield and egress of radioisotope from said vial to the exterior of said shipping shield;

(b) a shielded generator having means for absorbing and retaining a parent radioisotope from which a daughter radioisotope can be eluted, (c) a reservoir of eluant disposed in said assembly and in close proximity to said shielded generator and shipping shield, and having disposed thereon a sterile, one-way-check valve communicating to the atomosphere, (d) first conduit means communicating from said reservoir to said shipping shield, second conduit means communicating from said shipping shield to said shielded generator, and third conduit means communicating from said shielded generator to the exterior of said assembly;

(2) a shelf traversing the front exterior of said assembly, a portion of which is shielded by exterior shielding means, (3) a shielded elution vial into which said eluate is dispensed, and (4) filter means disposed at a point between said vial and said third conduit means.

2. A portable shipping shield for recharging a radioisotope generator, comprised of, in combination:

(i) a main shield having an inner chamber communicating to the exterior of said main shield, said chamber having a tapered portion thereof terminating with a greater diameter at the exterior surface of said main shield, (ii) a closure shield tapered to engage said main shield to provide a radiological safe seal and yet provide conduit means for ingress and egress of liquids, said closure shield having an inner bore traversing its center in alignment with the axis of, and about the same diameter of said chamber, (iii) a plug which is slidably mounted within said inner bore and which can be retained in a fixed position therein by a lip on its upper surface which engages a retaining shelf on at least one portion of said closure shield; said plug being retained in place by removable retaining means which when said plug is disengaged from said shelf it can slidably move through at least a portion of said bore and into said inner chamber, (iv) a vial for radioisotopes contained within and in alignment with said chamber and having a piercable septum on at least one end thereof, and (v) conduit and piercing means contained within said chamber for piercing said septum and permitting ingress of eluant from the exterior of said shipping shield and egress of radioisotope from said vial to the exterior of said shipping shield.

3. The generator of claim 1 wherein the shielded generator has means for absorbing and retaining molybdenum-99.

4. The generator of claim 3 wherein said means are alumina.

5. The generator of claim 1 wherein said main shield and said shielded generator are comprised of lead.

6. The generator of claim 1 wherein said first, second and third conduit means are shielded with lead.

7. The shipping shield of claim 2 wherein said vial is positioned in alignment with but maintained away from said piercing means by a collapsible retaining means.

8. The shipping shield of claim 7 wherein said collasible retaining means is a spring.

9. The shipping shield of claim 7 wherein said collapsible retaining means is comprised of plactic.

10. The shipping shield of claim 7 wherein said collapsible retaining means also serves to maintain the piercing means in a sterile condition.

* * * * *